US006802776B2

(12) United States Patent
Lind et al.

(10) Patent No.: US 6,802,776 B2
(45) Date of Patent: Oct. 12, 2004

(54) METHOD AND PROGRAM PRODUCT FOR PRODUCING AND USING GAME PLAY RECORDS IN A BINGO-TYPE GAME

(75) Inventors: Clifton Lind, Austin, TX (US); Gordon T. Graves, Austin, TX (US); Gary L. Loebig, Austin, TX (US); Jefferson C. Lind, Austin, TX (US); Joseph R. Enzminger, Austin, TX (US); Rodney L. Willyard, Flower Mound, TX (US); Robert Lannert, Broken Arrow, OK (US)

(73) Assignee: Multimedia Games, Inc., Austin, TX (US)

( * ) Notice: Subject to any disclaimer, the term of this patent is extended or adjusted under 35 U.S.C. 154(b) by 0 days.

(21) Appl. No.: 10/028,889

(22) Filed: Dec. 20, 2001

(65) Prior Publication Data

US 2002/0111207 A1 Aug. 15, 2002

Related U.S. Application Data

(60) Provisional application No. 60/265,100, filed on Jan. 30, 2001.

(51) Int. Cl.[7] .................................................. A63F 13/00
(52) U.S. Cl. ............................ 463/19; 463/42; 273/269
(58) Field of Search ......................... 463/16–19, 40–42; 273/138.1, 144 R, 138.2, 143 R, 460, 269

(56) References Cited

U.S. PATENT DOCUMENTS 4,140,320 A * 2/1979 Cortimilia ................... 273/293
5,193,815 A * 3/1993 Pollard ....................... 273/269
5,588,913 A 12/1996 Hecht
6,322,446 B1 * 11/2001 Yacenda ...................... 463/16

OTHER PUBLICATIONS

Bingo King Catalog; Catalog No. 295; 1996–1997; pp. 8, 25, 26, 45 and 124.

* cited by examiner

*Primary Examiner*—Jessica Harrison
*Assistant Examiner*—Aaron Capron
(74) *Attorney, Agent, or Firm*—Russell D. Culbertson; The Culbertson Group, P.C.

(57) ABSTRACT

A gaming system (10) utilizes a game designation generating component (16), a gaming establishment component (11), and a set of predefined bingo card representations. Each bingo card representation is stored in electronic format as a data structure or data record defining a predefined pattern of game designations chosen from a pool of available designations. The game designation generating component (16) generates sets of game designations from a pool of available designations. The method employed in the gaming system (10) includes pre-matching the bingo card representations to a given set of game designations to produce a matched card set. This pre-matching occurs prior to the sale, distribution, or assignment of card representations to players in the game. The matched card set includes a number of game play records, each corresponding to a different one of the bingo card representations and each being associated with a result indicator which indicates whether the respective bingo card representation is a winning card or losing card for that set of game designations. Data representing these matched card sets are stored and then the individual game play records are assigned to players in response to game play requests initiated by the players.

37 Claims, 11 Drawing Sheets

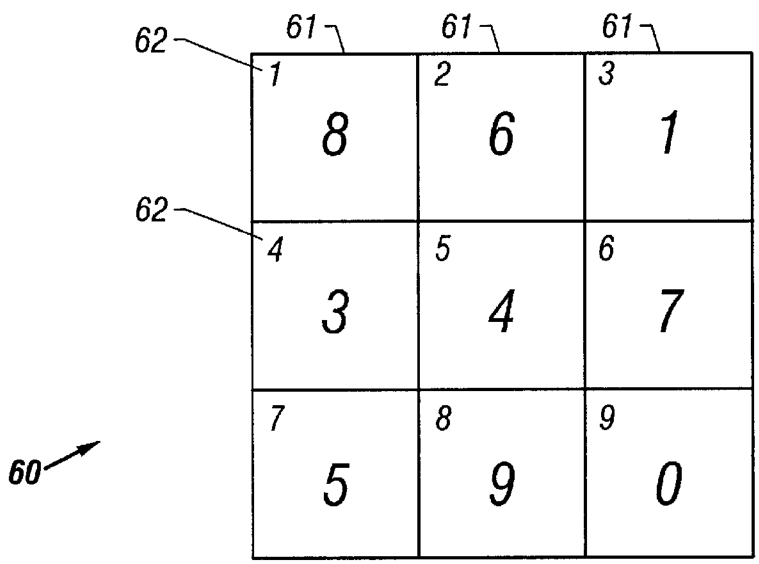

FIG. 5

PRIZE SCHEDULE (Prizes are in credits per credit wagered)

| Prize | Pattern | Odds (to 1) | Prize (credits) | Allocation |
|---|---|---|---|---|
| Super Jackpot* | Any 2 Row | 333,333 | 20000 | 6.00% |
| Jackpot | Middle Row | 1,000 | 100 | 10.00% |
| Must Go | Top or Bottom Row | 500 | 25 | 5.00% |
| Consolation | Column or Diagonal | 200 | 10 | 5.00% |
| Churn | Any 2 Adjacent Spots | 5 | 3 | 60.00% |
| Allocation to "Max Bet" Super Jackpot Progressive: | | | | 4.00% |
| | | | Total Prize Allocation: | 90.00% |

Note 1: 4% of all wagers is allocated to growth of the "Max Bet" Super Jackpot
Note 2: Average number of cards to end game: 333,33

FIG. 6

METHOD AND PROGRAM PRODUCT FOR PRODUCING AND USING GAME PLAY RECORDS IN A BINGO-TYPE GAME

CROSS-REFERENCE TO RELATED APPLICATION

This application is related to United States provisional patent application Ser. No. 60/265,100, filed Jan. 30, 2001 and entitled "Object Draw Gaming System and Program Product." The Applicants hereby claim the benefit of this provisional patent application under 35 U.S.C. §119(e). The entire content of this provisional application is incorporated herein by this reference.

TECHNICAL FIELD OF THE INVENTION

This invention relates to gaming and gaming systems. More particularly, the invention relates to a bingo-type gaming system in which a set of bingo card representations is pre-matched to produce a set of game play records which are later assigned to players. The invention encompasses a method, apparatus, and program product for implementing the gaming system.

BACKGROUND OF THE INVENTION

Bingo-type games are played with predefined bingo cards which each include a number of bingo game designations such as Arabic numerals randomly arranged in a desired manner, commonly in a grid. The bingo game designations on the cards are selected from a pool of available game designations. In more traditional bingo-type games the cards are physically printed on paper or other suitable material. These printed cards are purchased by players prior to the start of a game. Once all the cards for a game have been purchased, game designations from the available pool of game designations are selected at random. As the game designations are selected and announced in the game, the players match the randomly selected game designations with the designations printed on their respective card or cards. This matching and marking of matched designations on the bingo card is commonly referred to as "daubing" the card. The player first producing a predetermined pattern of matches between the randomly selected game designations and the printed card designations is considered the winner. Consolation prizes may be awarded to players having cards matched to produce consolation prize patterns at the time of the winning pattern.

There are numerous variations on the traditional bingo game. Some bingo-type games perform a draw to produce a set of game designations prior to the sale of printed bingo cards. These bingo-type games use printed cards like regular printed bingo cards, but with the card face concealed in some fashion. Once a player purchases one of these covered face bingo cards, the player can match the drawn designations to the printed card designations to determine if the matched designations produce some predetermined winning pattern. The first player to redeem a card with the winning pattern ends the game.

Another variation of the traditional bingo game is played with electronic bingo card representations rather than the traditional printed bingo cards. In these bingo-type games, each bingo card is represented by a data structure which defines the various card locations and designations associated with the locations. This bingo-type game is played through player stations connected via a communications network to a central computer system. The central computer system is responsible for storing the bingo card representations and distributing or communicating bingo card representations to players at the player stations. The player stations display the bingo cards defined by the card representations and also allow the players to daub or mark designation matches as game designations are announced in the game. A primary advantage of this electronic bingo game is that the games may be played at a much faster pace than is practical with traditional paper bingo. Another advantage of this electronic version of bingo is that the games can be administered and controlled from a remote location and actually played at a number of different bingo establishments.

Traditional bingo games, either played with paper cards or electronic card representations are limited in the manner in which the results of a game may be displayed. In order to maintain player interest in the game, it is desirable to have an option of displaying results to the players in a variety of different fashions. It is also desirable to further increase the speed at which bingo-type games may be played. Yet it is essential that the game retain the basic characteristics of a bingo-type game, namely that the game is played with predefined cards or card representations which the players match or daub against randomly generated game designations, and the game winner is the first player to match the designations in a predetermined winning pattern on his or her card or card representation.

SUMMARY OF THE INVENTION

A gaming system embodying the principles of the invention utilizes a game designation generating component, a gaming establishment component, and a set of predefined bingo card representations. Each bingo card representation is stored in electronic format as a data structure or data record defining a predefined pattern of game designations chosen from a pool of available designations. The game designations associated with a given bingo card representation may be referred to as card designations. The game designation generating component generates sets of game designations from a pool of available designations. Winning and losing bingo card representations for a particular game are determined by matching the card designations to a game designation set produced for that game. A card representation having designations which match designations from the given game designation set in a predetermined game ending pattern is considered a winning card for the given game designation set. Card representations having designations which match the given set of game designations in other predetermined patterns before the game ending pattern is achieved are also considered winning cards and are awarded other prizes.

The method according to the invention includes pre-matching the bingo card representations to a given set of game designations to produce a matched card set. This pre-matching occurs prior to the sale, distribution, or assignment of card representations to players in the game. Each matched bingo card representation in the matched card set represents a respective game play record for use in the present gaming system. The matched card set thus includes a number of game play records, each corresponding to a different one of the bingo card representations. As used in this disclosure and the accompanying claims the term "number" when referring to a quantity of items means some quantity of more than one such item. Each game play record in the matched card set includes or is associated with a result indicator which indicates whether the respective bingo card representation is a winning card or losing card for that set of game designations. The invention also includes assigning individual game play records from the matched card set in response to game play requests initiated by players. Data representing the matched card sets may be stored in a data storage device and individual game play records may be assigned as needed from the data storage device.

In the play of a bingo-type game according to the invention, a set of game designations is determined by the game designation generating component. A processing device included in the gaming establishment component matches the set of bingo card representations to the set of game designations provided by the game designation generating component and stores the resulting matched card set. The matched card set is stored in a secure fashion so that no one can see the results of the pre-matching and thus the result associated with any game play record in the set.

Once the stored matched card set is opened for play, a player at the gaming establishment component may purchase a game play record from the set through a player station included in the gaming establishment component. That is, in response to a game play request initiated by the player at a player station, the player is assigned a game play record in some random order from the respective matched card set. Since each game play record corresponds to a bingo card representation, the assignment of a game play record to a player is equivalent to distributing the underlying bingo card representation to the player. The information that the player station actually receives in response to a game play request is sufficient to allow the player station to display the results associated with the game play record, that is, the results of matching the respective card designations to the given set of game designations. If the matched designations for the bingo card representation corresponding to the assigned game play record produces one of the predetermined winning patterns, the player receives credits or winnings. However, if the matched designations for the bingo card representation corresponding to the assigned game play record does not produce one of the predetermined winning patterns, the player receives no winnings or credits.

A game according to the invention ends once a player has received or has been assigned results from a game play record (that is, "holds" a game play record) corresponding to a card representation matched to produce a particular predetermined game ending pattern. Thus, the game ending pattern sets the criteria for ending a bingo-type game pursuant to the invention. The game ending criteria may be, for example, the first game play record assigned in which the corresponding bingo card representation has all of its card designations matched by the designations included in the set of game designations. In any event, once the game ending criteria are met for a given game according to the invention, play continues with a new matched card set which has previously been created using a different set of game designations. A number of matched card sets may be produced and stored to provide substantially continuous play of successive games, each matched card set representing the bingo card representations and results for a separate bingo-type game.

The gaming establishment component preferably includes a cashless gaming system, although cash based systems and cash equivalent systems may be employed according to the invention. In the preferred cashless gaming system, a player places wagers electronically at a player terminal included at the gaming establishment component, and receives results of the wager electronically as well. Accounting for the preferred cashless system is managed through a back office portion of the gaming establishment component.

The gaming system according to the invention allows the results of each wager to be displayed quickly and in a variety of fashions or formats. The game may be played like any bingo-type game with the graphical representation of the card being displayed at the player station and the player controlling the player station to daub the card to determine if the card is a winning or losing card. Alternatively to this manual daubing, the gaming system may automatically daub the card representations corresponding to the game play request assigned to the player and cause the player station to display the results of the automatic daubing, that is, the results associated with the respective game play record. This automatic daubing allows the results of the wager to be displayed to the player at the player terminal to mimic some other game or contest such as a casino game for example. However, the underlying game remains a bingo-type game, that is, a game having the essential characteristics of a bingo game as described above.

These and other objects, advantages, and features of the invention will be apparent from the following description of the preferred embodiments, considered along with the accompanying drawings.

BRIEF DESCRIPTION OF THE DRAWINGS

FIG. 5 is a representation of a game card used in the present invention.

FIG. 6 is chart showing a prize schedule which may be used according to the invention.

DESCRIPTION OF THE PREFERRED EMBODIMENTS

Figure 1:
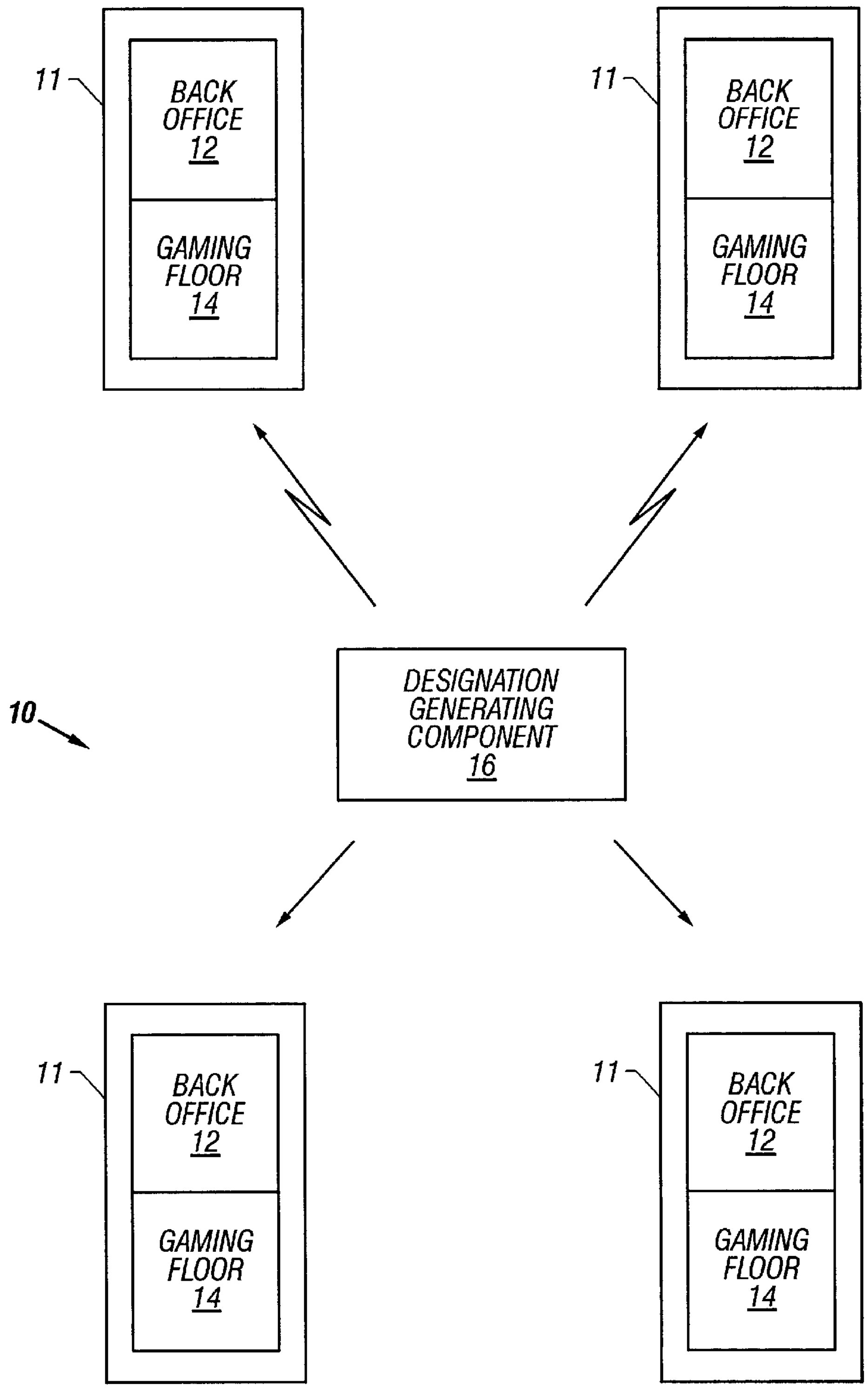
FIG. 1 is a diagrammatic representation of a gaming system embodying the principles of the invention.

Referring to FIG. 1, a gaming system 10 embodying the principles of the invention includes at least one and preferably many gaming establishment components 11 each having a back office system 12 and a gaming floor or casino floor system 14. Gaming system 10 also includes a designation generating component 16 in communication with each gaming establishment component 11. Gaming floor system 14 is accessible to the public and allows players to establish and modify accounts in gaming system 10. Players also use gaming floor system 14 to participate in various games available through gaming system 10. Back office system 12 maintains accounts and account balances for players, maintains account information, and provides system usage reports and other reports useful in managing gaming activities at the particular gaming establishment component 11. Each back office system 12 also matches electronic bingo cards (bingo card representations) to sets of game designations, stores the matched card sets, and assigns the game play records from the matched card sets in response to player requests made through the respective gaming floor system 14.

For each game played according to the invention, designation generating component 16 produces a series or set of game designations and communicates the set of game designations to the various gaming establishment components 11. In one preferred form of the invention, designation generating component 16 includes an automated ball draw system which automatically draws a desired number of balls or other objects from a group of such objects. Each object is associated with a designation so that the series of objects drawn by the device identifies or defines a set of game designations. Alternatively to the object draw device, designation generating component 16 may comprise any suitable arrangement for generating designations at random from a pool of available designations to produce the desired set of game designations. Regardless of how the set of game designations is produced, the resulting set of designations is communicated to the gaming establishment components 11. A secure communications arrangement is used to provide communications from designation generating component 16 to the various gaming establishment components 11.

Figure 2:
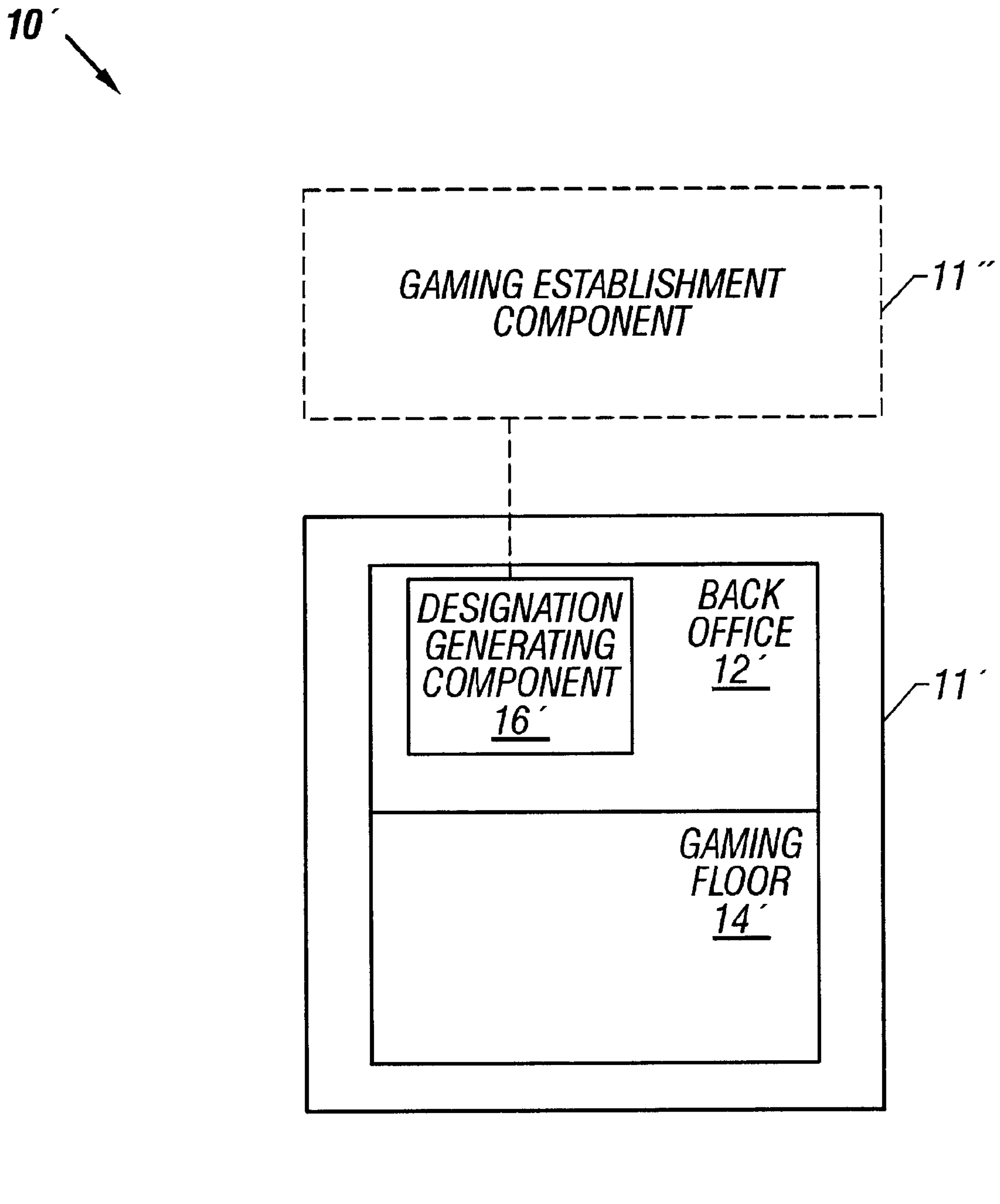
FIG. 2 is a diagrammatic representation of an alternate gaming system embodying the principles of the invention.

FIG. 2 shows an alternate gaming system embodiment 10'. In this form of the invention, designation generating component 16' is dedicated to a single gaming establishment component 11'. In particular, designation generating component 16' is implemented as part of the back office system 12' for gaming establishment component 11'. As a further alternative arrangement, designation generating component 16' may be connected to communicate sets of game designations not only to the local gaming establishment component 11', but also to another gaming establishment component 11" shown in dashed lines in FIG. 2.

Figure 3:
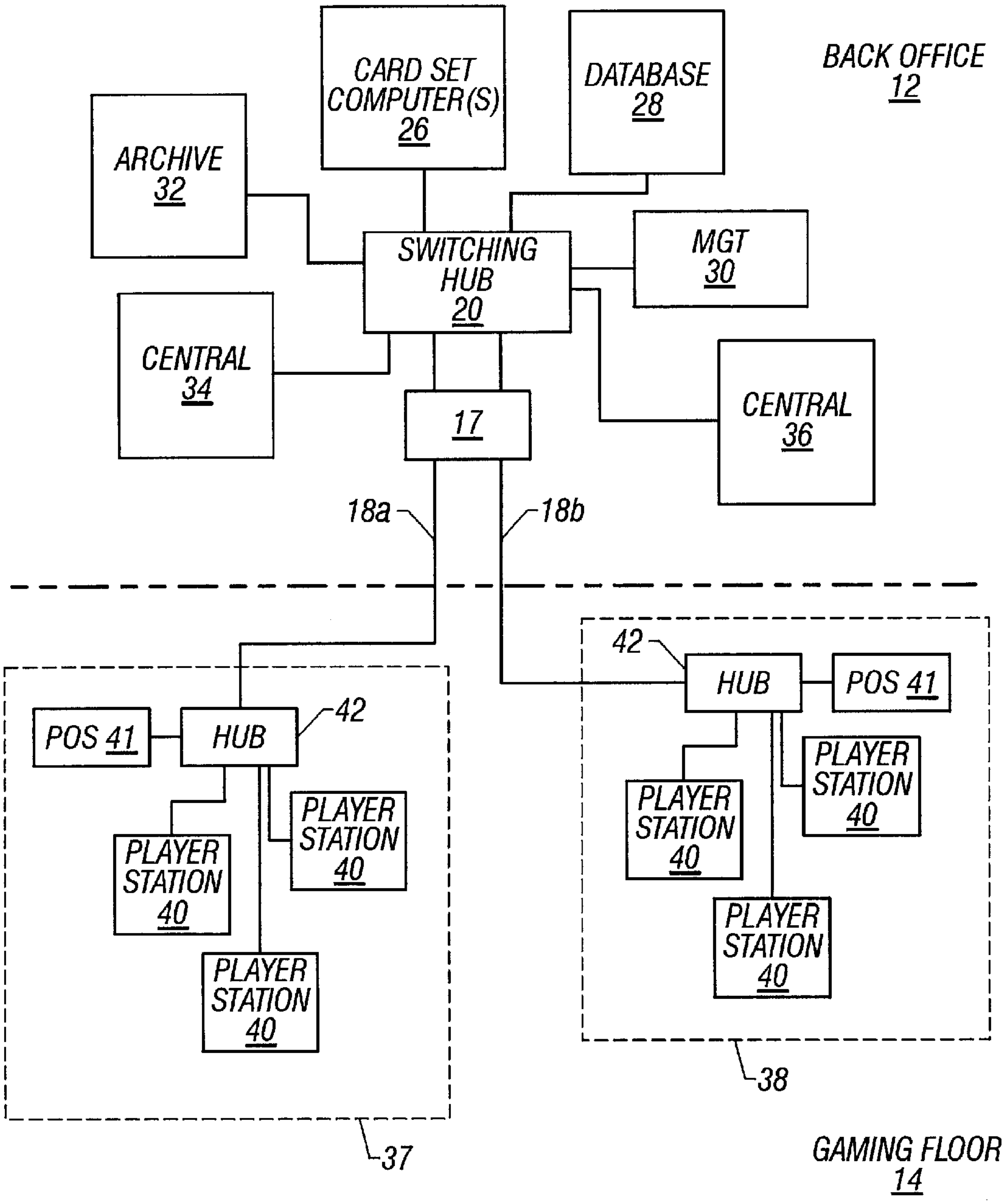
FIG. 3 is a diagrammatic representation of a gaming establishment component according to one form of the present invention.

FIG. 3 shows further detail of a single gaming establishment component 11. As shown in FIG. 3, a secure communications arrangement facilitates communications between back office system 12 and gaming floor system 14. Security may be enhanced with hardware firewalls 17 connected in the communications lines 18*a* and 18*b* which extend to gaming floor system 14 and/or by firewall software operating on the various computers that make up back office system 12.

Back office system 12 includes a number of separate processing devices interconnected through a suitable communications arrangement. In the illustrated form of the invention, back office system 12 comprises a local area network of individual processing devices and includes a switching hub 20 to which each separate processing device connects. The two floor system communication links 18*a* and 18*b* also connect into switching hub 20. Although other types of computer network communications hubs may be used within the scope of the invention, a switching hub is preferred to allow the various system components to communicate simultaneously with fewer conflicts, and thus with increased overall system performance.

The illustrated preferred form of back office system 12 shown in FIG. 3 includes one or more card set computers 26, a database computer 28, a management computer 30, an archive computer 32, and two separate central computers 34 and 36. Card set computer 26 produces and stores one or more matched card sets, each matched card set including a number of game play records. Each game play record corresponds to an individual bingo card representation in a set of bingo card representations used in creating the matched card sets. The matched card sets, or rather, data representing the matched card sets, are stored in a suitable storage device associated with card set computer 26 until a new or unused set is requested by one of the central computers 34 or 36. At that time, one or more of the matched card sets is communicated to the requesting central computer. Card set computer 26 may also be used to manufacture the set of bingo card representations to be used in the system. Alternatively, a set or perm of bingo card representations may be generated elsewhere and stored in card set computer 26 to be used in producing the desired matched cards sets. It will be noted that the invention requires only a single set of bingo card representations to be used in creating numerous matched card sets; however, different sets of bingo card representations may be used to create matched card sets within the scope of the present invention. The structure of the individual bingo card representations will be discussed further below with reference to FIG. 5 and the structure of the matched card sets and game play records will be discussed below with reference to FIG. 11.

In the preferred form of the invention shown in FIG. 3, card set computer 26 may also control a local object draw device or other game designation generating device (such as device 16' shown in FIG. 2) and receive sets of game designations from that device. Where software code is executed to generate the required sets of game designations, the game designation generation code may be executed by card set computer 26. As a further alternative, the object draw or other device may include its own dedicated controller or processor which supplies sets of game designations to card set computer 26. In the implementation of the invention shown in FIG. 1, card set computer 26 may receive sets of game designations from the remote game designation generating component (16 in FIG. 1) through any suitable communications arrangement.

Each central computer 34 and 36 is programmed to communicate with card set computer 26, database computer 28, and with a particular group of gaming floor devices. FIG. 3 shows two separate groups of gaming floor devices, group 37 and group 38, for purposes of example. Central computer 34 is programmed to communicate with each of the gaming floor devices in group 37, while central computer 36 is programmed to communicate with each of the gaming floor devices in group 38.

Each central computer 34 and 36 stores data representing one or more matched card sets provided from card set computer 26 for use by the gaming floor devices as described below. Each central computer also receives information from the various gaming floor devices in the respective group. Some of this information is stored in database computer 28. For example, central computer 34 receives requests from devices in group 37 to open a player account, add funds to a player account, and withdraw funds from a player account. Central computer 34 also receives game play requests from devices in group 37 and sends game play record information to the respective device in the group from which the respective game play request was received.

The multiple central computer arrangement shown in FIG. 3 provides several advantages. First, in the event that one of the central computers 34 or 36 experiences a technical problem which prevents it from operating properly, only a single group of gaming floor devices is affected. Second, the multiple central computer arrangement shown in FIG. 3 is readily scalable to increase or decrease the number of gaming floor devices supported by the system. Furthermore, the multiple central computer arrangement allows faster communications with the gaming floor devices and therefore increases the speed at which a player may play the game or games offered through gaming system 10.

Database computer 28, along with its associated data storage device or devices, serves as a data storage repository for storing all player records and system usage information. Most importantly, database computer 28 stores in its associated data storage a player account table having entries corresponding to the various player accounts. The player account information includes, for example, the player's name, the player's account identifier or number, in some cases a personal identification number (PIN) for the player, and perhaps other player information personal to the particular player. Database computer 28 may also collect and store usage information indicating the gaming floor devices players have used, and the extent of use.

Numerous different database structures for use in database computer 28 will be apparent to those of ordinary skill in database development and application. The invention encompasses any suitable database structure for maintaining the player account information and other information required in the operation of the gaming system 10.

Management computer 30 operates under the control of management software to provide system reports including real-time reports and system usage and performance reports of interest to the system operators, managers, or regulators. The software executed at management computer 30 also may be used to schedule administrative functions required or helpful for the database computer system 28. Management computer 30 may include a suitable display for providing a user interface and for displaying reports and other information. Although not shown in FIG. 3, a printer may also be included in the back office portion of the network or may be connected directly to management computer 30 for printing system reports and usage records.

In the preferred form of the invention, central computers 34 and 36 send used matched card sets back to card set computer 26. Card set computer 26 then periodically sends the used matched card sets to archive computer 32 which serves as a repository for used matched card sets. Archive computer 32 is also preferably used to store a copy of each complete unused matched card set as well. These unused matched card set copies and used matched card sets may be archived or stored in any suitable fashion in a nonvolatile memory or storage device associated with the archive computer 32.

Referring now to the gaming floor devices shown in FIG. 3, each group 37 and 38 includes a number of player stations 40 and a point-of-sale or cashier terminal (POS) 41, all connected to a local area network communications hub 42. Although not shown in the figure, each group may also include one or more remote point-of-sale (RPOS) terminals, and one or more kiosks also connected to the communications hub 42. The communications hub 42 of each gaming floor group is connected to switching hub 20 of the back office system 12 through one of the communications lines 18*a* or 18*b*.

Figure 4:
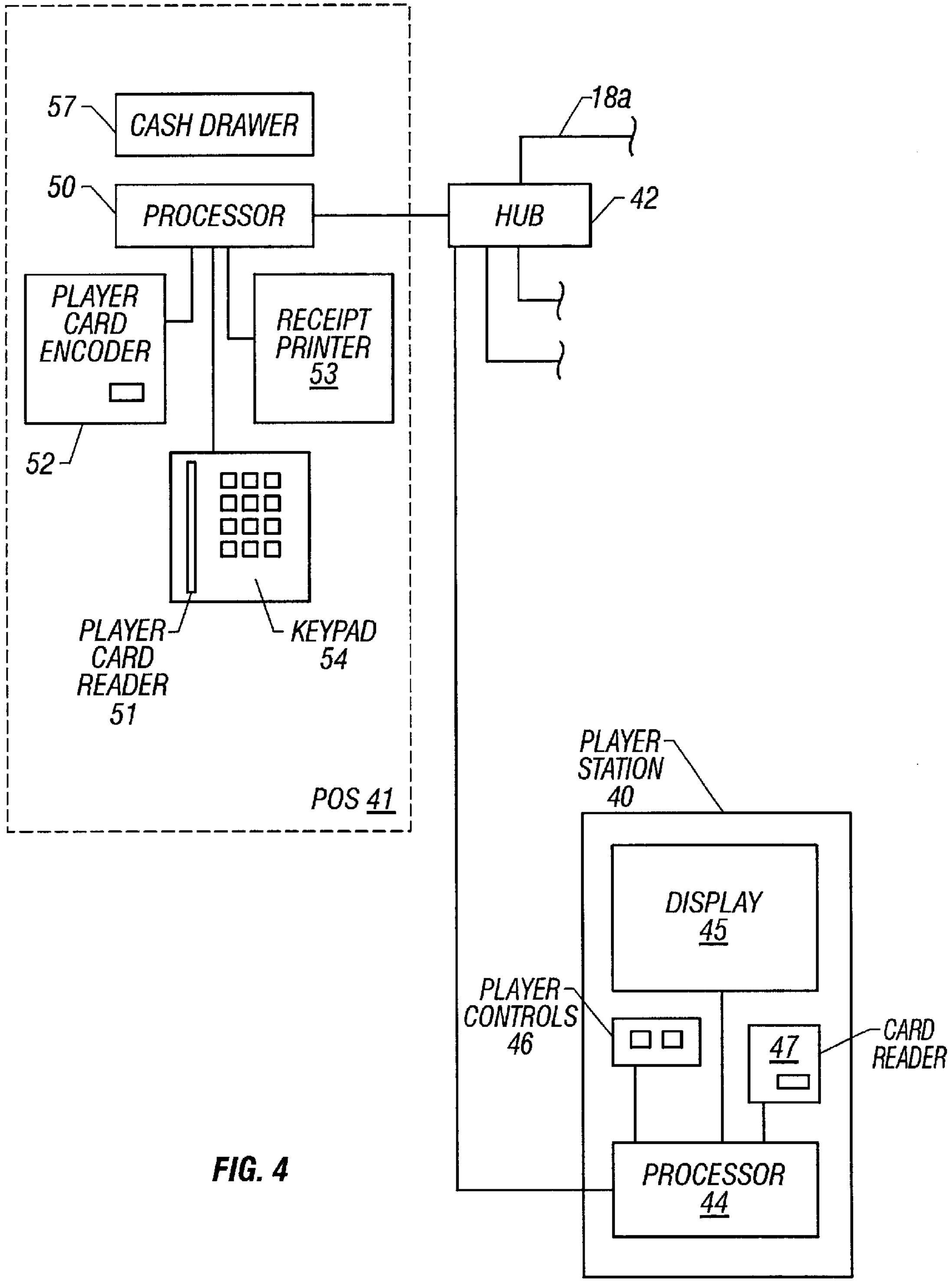
FIG. 4 is a diagrammatic representation of the point-of-sale terminal and player station included in the present gaming system.

As shown in FIG. 4, each player station 40 includes a computer system having a processor 44, a touch screen display 45, a control panel 46, and a player card reader 47. Player station software executed by processor 44 receives information from player card reader 47 to log a player into the respective central computer (34 or 36), and then allow the player to participate in the games available through the terminal by purchasing pre-matched bingo card representations through his or her corresponding game play records. The player station software also causes display 45 to show a player the results of play as dictated by the purchased bingo card representation/game play record. Further information on the operation of the player stations will be described below with reference to FIG. 9.

It will be appreciated that the player stations may include other hardware depending upon the particular implementation of the gaming system. For example, it may be desirable for a player to add money to his or her account at the player station or simply add money for a wager at the player station. In these instances, player station 40 may also include a token, coin, or bill accepting device not shown in the present drawings, or some other device for accepting some form of payment at the player station. Although the illustrated "cashless" gaming arrangement comprises a preferred implementation for the gaming establishment components 11 shown in FIG. 1, it will be appreciated that the gaming system 10 or 10' is not limited to this preferred "cashless" gaming system or to any other system for interacting with the game players.

The example POS terminal 41 shown in FIG. 4 enables a player to open an account with the gaming system, add funds to his or her account, and close or cash out his or her account. In alternative forms of the invention, POS terminal 41 may allow a player to actually initiate a game play request and receive results in the form of a printed ticket. POS terminal 41 comprises a computer system having a processor 50 and a player/cashier interface including a player card reader 51, player card printer/encoder 52, a receipt printer 53, and keypad 54. POS terminal 41 also includes a cash drawer 57 which is accessible by a POS cashier or attendant. Processor 50 included in POS terminal 41 executes operational software to perform the steps described below with reference to FIG. 8.

Referring now to FIG. 5, each electronic game card or bingo card representation comprises a data structure that defines a grid 60 or other arrangement of designations 63. The illustrated grid 60 may be referred to as a nine-spot grid or card having nine separate locations 61 arranged in a three-by-three pattern. It will be appreciated that the card shown in FIG. 5 is shown only for purposes of example and that the invention is not limited to such a game card or card representation. Five-by-five bingo card representations or any other suitable representations may be used in lieu of the illustrated three-by-three card. For purposes of example only, the separate locations 61 on the illustrated three-by-three card are numbered one through nine by the location identifying numbers 62 appearing in the upper left hand corner of each location. Each game card has a random arrangement of card designations 63 positioned at the various locations 61 of the game card. In the illustrated example, card designations 63 comprise Arabic numerals. The designation residing at location 1 comprises the numeral 8 while the designation residing at game card location 2 is the numeral 6, and so forth as indicated in the illustration. The designations associated with the various locations 61 of the game card are selected from a pool of available designations.

Although the physical three-by-three grid is shown for purposes of illustrating a bingo card representation according to the present gaming system 10, it will be appreciated that the bingo card is actually represented in electronic form for use in the system. The data required to define a given bingo card representation may be arranged in any suitable fashion. For example, the game card may be represented by a series of the nine numerals with the first numeral in the series representing the designation at location 1, the second numeral in the series representing the designation at location 2 and so forth. In this format, the electronic representation for the bingo card shown in FIG. 5 will be a representation comprising series of numbers 8, 6, 1, 3, 4, 7, 5, 9, and 0. Each bingo card representation will also preferably include or be associated with a card identifier or serial number which distinguishes that particular bingo card representation from each other bingo card representation in the set.

It will also be appreciated that the invention is not limited to the illustrated designations comprising Arabic numerals. Any type of designation may be used according to the invention. However, the Arabic numeral designations are preferred because they may be conveniently represented in a digital format for processing with the various data processing devices which implement gaming system 10.

In game system 10, players effectively purchase bingo card representations by initiating game play requests through the various player stations 40, and perhaps through POS terminals 41 in some alternative arrangements. Each valid game play request causes a game play record corresponding to a pre-matched bingo card representation to be assigned to the player initiating the game play request. The result associated with that game play record is determined by the pattern in which the set of game designations for the particular game match the designations associated with the corresponding bingo card representation. FIG. 6 shows a payout table or prize schedule for a game which may be implemented through gaming system 10. In this example, the jackpot is won by a player who purchases a bingo card representation (that is, a player who is assigned a game play record corresponding to the card representation) having card designations matched by the set of game designations to completely fill in the middle row of the game card. In the example card shown in FIG. 5, the card would be a jackpot winner for the game designation set including the designations 3, 4, and 7.

Operation of the Gaming System

Figure 7:
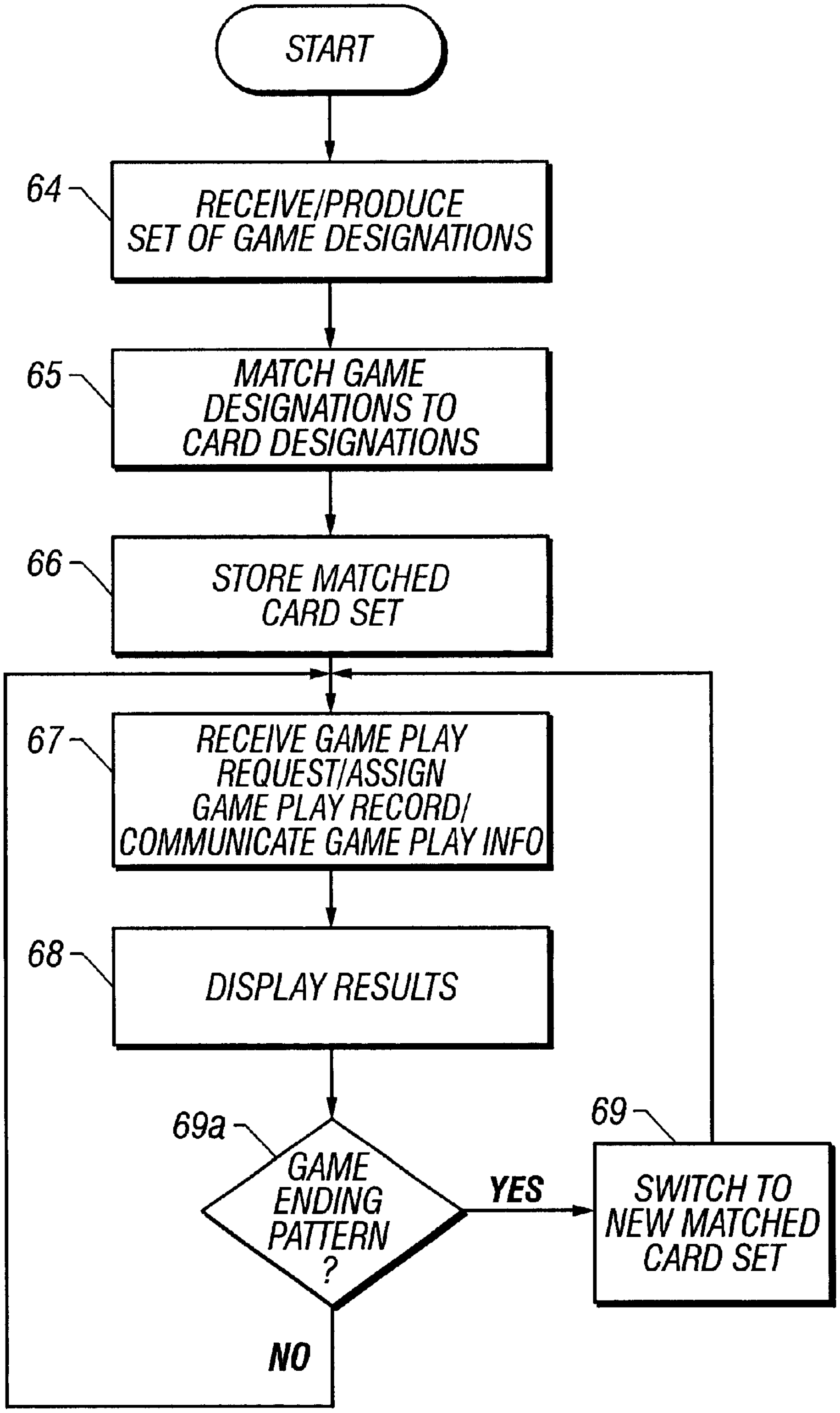
FIG. 7 is a flow chart showing the process steps associated with the overall play of a game according to the gaming system.

Referring to FIG. 7, a gaming method according to the invention includes at process block 64 receiving or generating a set of game designations at a gaming establishment component 11 (FIG. 1). The preferred form of the invention then includes matching the set of game designations with card designations of the respective bingo card representations as shown at process block 65. This step produces a matched card set which includes a number of game play records. Each game play record corresponds to a different one of the bingo card representations. In the preferred form of the invention, each game play record includes at least a card identifier for the respective bingo card representation, and a result indicator which indicates the result of the game play record, that is, the result of the match between the set of game designations and the card designations. The game play record may also include data defining the actual bingo card representation. Details and variations in the game play records will be discussed further below with reference to FIG. 11.

As shown at process block 66 in FIG. 7, the method further includes storing the data representing the matched card set in a suitable data storage device. In the implementation shown in FIGS. 1 and 3, the steps of receiving/generating the set of game designations, matching the card designations to produce the matched card set, and storing the data representing the matched card set are all performed by operational program code executed at card set computer 26. In particular, matching program code performs the matching step and game set storage program code performs the storage step. Where card set computer 26 functions as the designation generating device, it also executes a suitable designation generation program which may invoke a random number generating function to generate the desired set of game designations. Otherwise, card set computer 26 simply includes some communications arrangement for receiving the set of game designations from the remote designation generating device (16 in FIG. 1).

In the preferred form of the invention, the process of receiving a set of game designations and producing matched card sets is repeated a number of times at a start of a gaming session to produce a number of matched card sets. The number of matched card sets may be necessary to ensure that the gaming system does not run out of game play records in the course of a gaming session. Also, several different bingo-type games may be in play at any given time in the preferred gaming system, and a different matched card set is required for each different game in play. In fact, each matched card set represents an individual bingo-type game. In one preferred implementation, a player may have a choice of wager level, one credit, two credits, or three credits for example, where each credit is equivalent to some monetary amount. In this case, the different wager levels actually enter the player (that is, represent a game play request) in a different bingo-type game/matched card set. Thus, at least one matched card set must be available for each wager level available in the gaming system.

It will be appreciated that matched card sets may be generated very quickly with current data processing devices and techniques. It may therefore not be necessary to produce and store many different matched card sets for play in the present gaming system. Rather, a matched card set may be produced only as necessary in order to service or respond to play requests initiated by players in the gaming system. In this alternate form of the present invention, the central computer may simply await a game play request by a player, determine if a matched card set is currently available or in play, and if not, generate a new matched card set. The game play request is serviced (a card representation is assigned) from the matched card set that is in play, or if a new matched card set is created, from the new matched cards set.

The matched card set storage step 66 in FIG. 7 is performed initially at card set computer 26. However, the preferred form of the invention utilizing central computers 34 and 36 in FIG. 3 also stores matched card sets in storage associated with the central computers. As discussed further below, the game play records are assigned to players directly from the central computers rather than from card set computer 26.

Referring now to process block 67 in FIG. 7, the method also includes assigning game play records from an appropriate matched card set in response to a game play request initiated by a player either at a player station 40 (FIG. 3) or perhaps at a POS terminal 41. In the preferred form of the invention, this assignment step is performed by game play assignment program code executed at the central computer (34 or 36 in FIG. 3) receiving the game play request. As will be discussed further below with reference to FIGS. 9 and 10, a central computer, 34 for example, monitors for the receipt of a game play request. If the request is valid, the respective central computer assigns a game play record from the appropriate matched card set to the requesting player as shown at process block 67 in FIG. 7. Sufficient data is then communicated back to the device through which the game play request was initiated to give the player the results of the game play. This data includes a result indicator which may comprise as much as data sufficient to define the bingo card representation corresponding to the assigned game play record together with the matches made in the matching step 65, or as little as a code for indicating the result. Regardless of the manner in which the game play results are communicated to the player, the method includes the step of displaying the results associated with the game play to the player as shown at step 68. The manner in which results may be displayed is discussed with reference to FIGS. 8 and 9.

If the assigned game play record corresponds to a bingo card representation that is not matched in a predetermined game ending pattern, as indicated at decision block 69*a* in FIG. 7, the process loops back to the point above the game play record assignment step (67) and the system waits for the next game play request. However, if the assigned game play record corresponds to a bingo card representation matched in the game ending pattern, the process includes switching to a new bingo-type game represented by a new matched card set as indicated at process block 69. After switching to the new matched card set, the method includes simply waiting for the next game play request. It will be noted that there may be unassigned matched card representations remaining in the matched card set after the game play record corresponding to the card representation having the game ending pattern has been assigned and is held by a player. Any of these unassigned matched card representations or game play records therefore are preferably disregarded by the system and are not used.

When a player opens an account in the preferred "cashless" gaming system 10, his or her account is associated with an account identifier or number. This assigned identifier is then used as an identification element to access the account later. The player also preferably receives a player card encoded with the particular identification element in a suitable machine readable fashion. The player may also be required to set a personal identification number (PIN) for his or her account which must be used in conjunction with the identification element in order to access the player's account, at least for certain purposes. Player information including the player's name, account identifier, and PIN are stored in back office system 12, and specifically in a player account table stored in a data storage device associated with database computer 28. The player's account identifier is encoded on the player card so that account access may be initiated by swiping the card through an appropriate reader such as the player station card reader 47. Alternatively, account access may preferably be initiated by keying in the player account identifier through a suitable system interface. If the player has sufficient funds in his or her account with gaming system 10, he or she may purchase one or more game play records/pre-matched bingo card representations at the various player stations 40 (FIGS. 3 and 4) as will be described in detail below.

Figure 8:
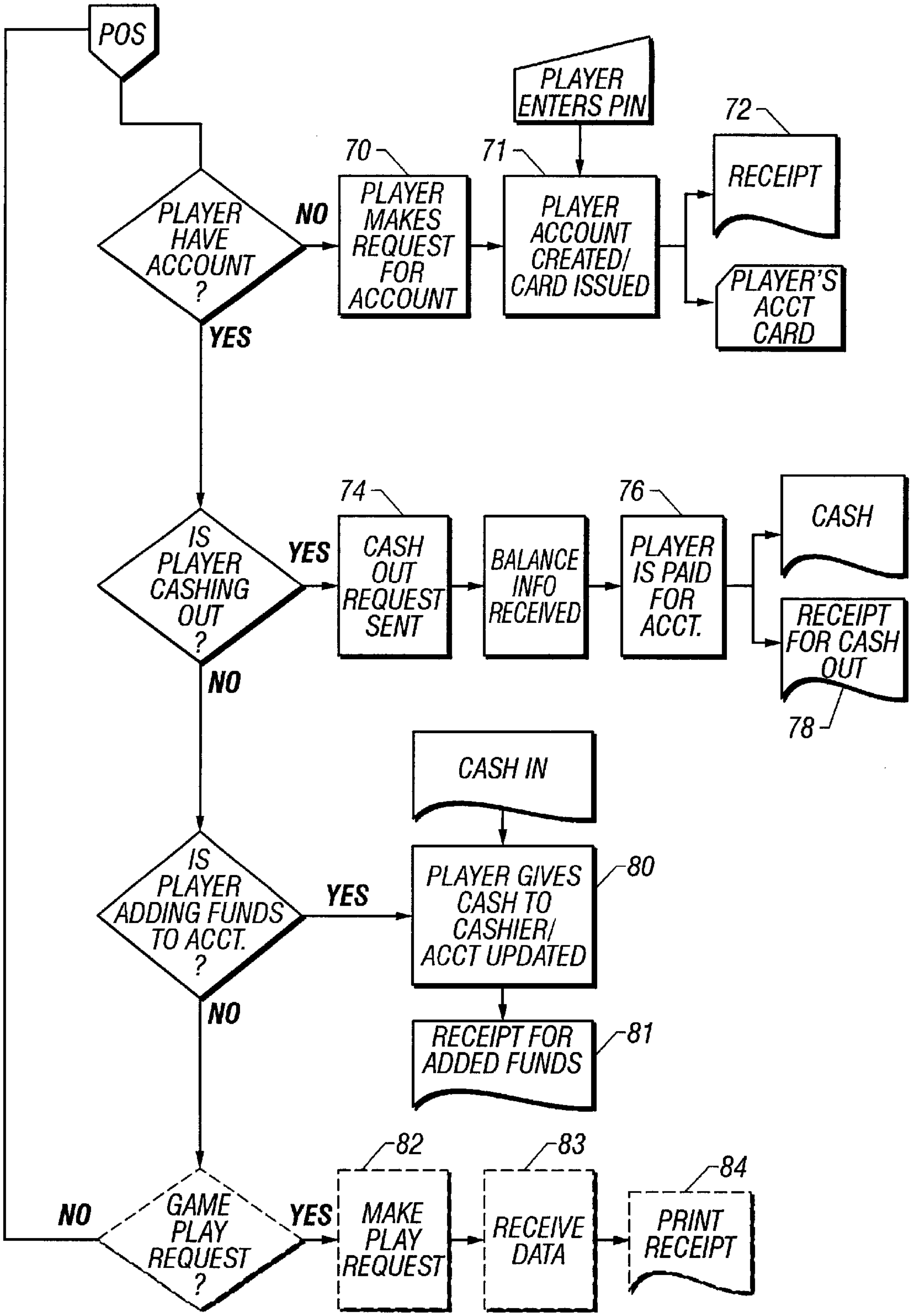
FIG. 8 is a flow chart showing process steps associated with the operation of the point-of-sale terminals.
Figure 9:
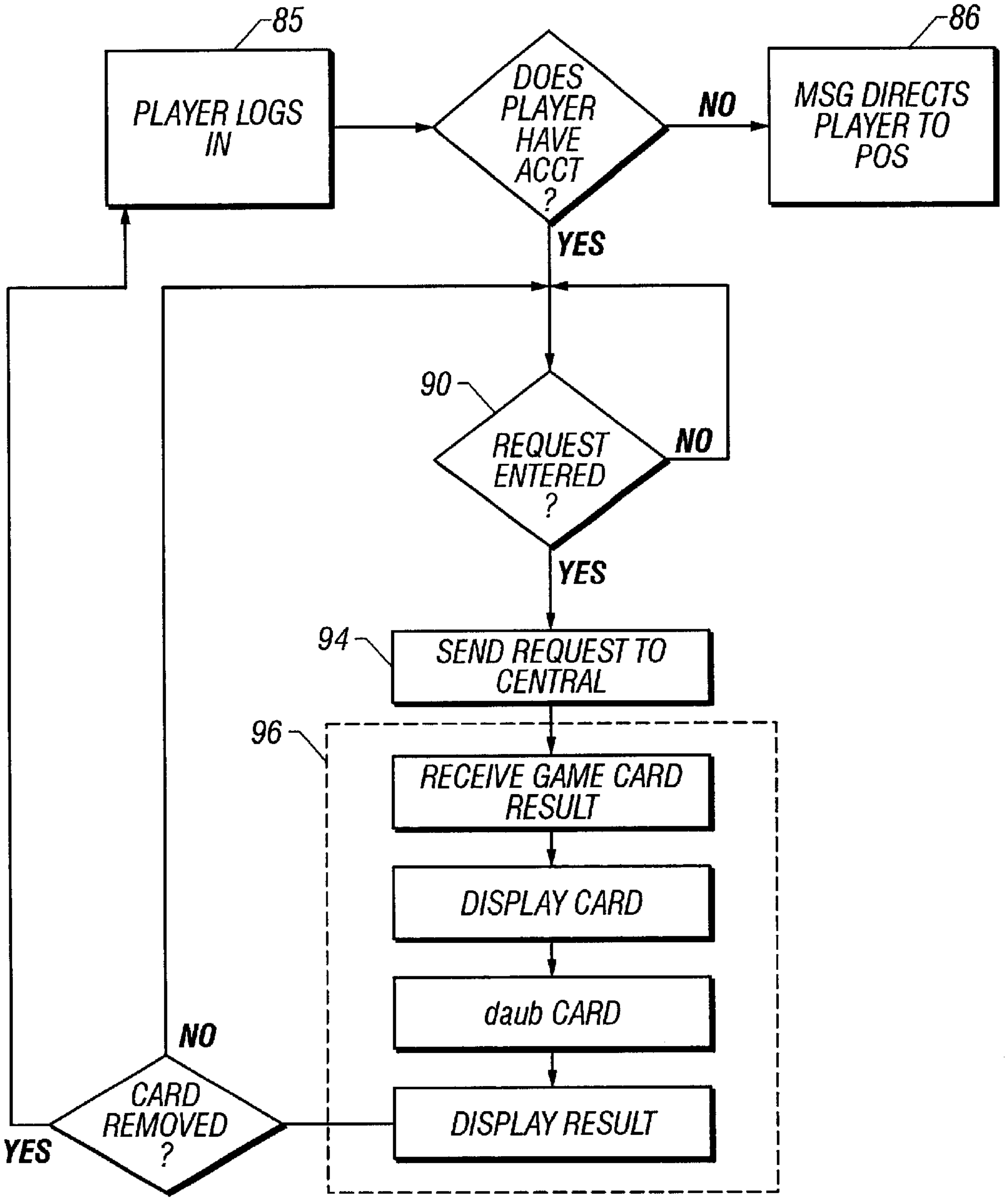
FIG. 9 is a flow chart showing process steps associated with the operation of the player stations.
Figure 10:
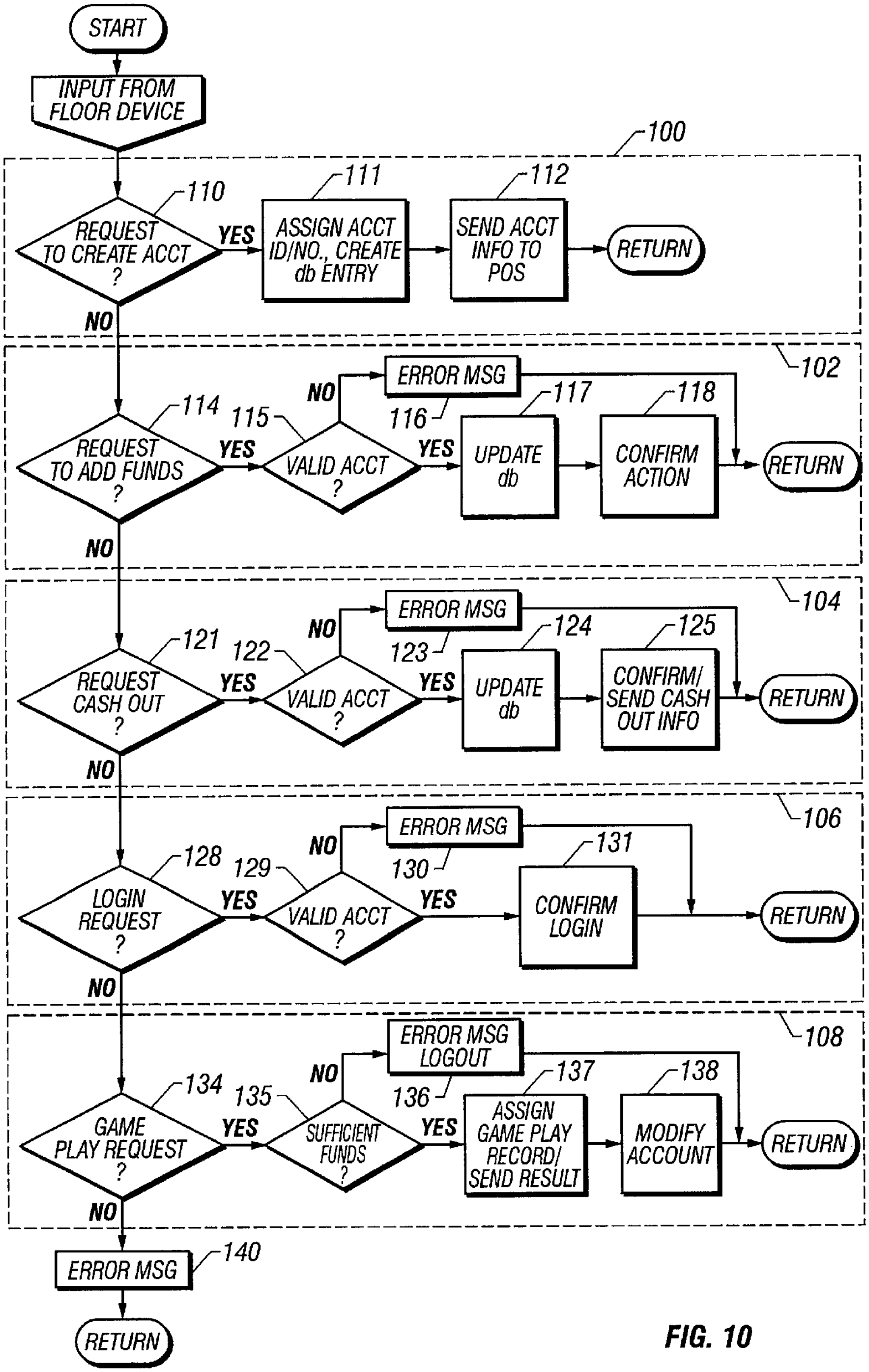
FIG. 10 is a flow chart showing process steps at the central computers.

FIGS. 8 and 9 illustrate the processes performed at the gaming floor devices shown in FIGS. 3 and 4, while FIG. 10 illustrates the processes performed at a central computer 34 or 36 shown in FIG. 3. In the preferred implementation of the invention shown in FIG. 3, each of the gaming floor devices cooperate with a particular central computer, and thus it is necessary to refer to a particular central computer when describing the game floor device processes. For purposes of example, all of the processes described with reference to FIGS. 8 and 9 will refer specifically to central computer 34; however, it will be appreciated that the other central computers cooperate with their respective gaming floor devices in the same fashion. Similarly, FIG. 10 will be described with reference to central computer 34 in order to simplify the discussion, although the identical processes are performed by each central computer in the system.

FIG. 8 illustrates the various processes performed at the POS terminals 41 shown in FIGS. 3 and 4. The primary functions performed through POS terminals 41 include opening player account, closing or cashing out a player account, or adding funds to a player account. The process of opening an account includes at process block 70 sending an account request from the POS terminal 41 to the associated central computer 34. As will be discussed below with reference to FIG. 10, central computer 34 returns an account identifier which is encoded onto a player's card at player card printer/encoder 52 (FIG. 4). The player's account card is then issued by the printer/encoder 52. The encoding and issuing step is shown at 71 in FIG. 8. The preferred system also prints an account opening receipt as shown at process block 72 using the POS terminal printer 53 (FIG. 4). The player can then use the player card to log in at a player station 40 as will be discussed further below with reference to FIG. 9.

If the player desires to close or cash out his or her account, POS terminal 41 communicates a cash out request to the respective central computer 34 (FIG. 3) as shown at process block 74. The respective central computer responds with a message indicating the player's account balance. Upon receipt of this balance information at process block 75, the cashier at POS terminal 41 may pay a cash balance to the player as indicated at process block 76. POS terminal 41 may also use the data received from the central computer to print a cash out receipt as shown at block 78 using POS terminal receipt printer 53 shown in FIG. 4.

If the player desires to add funds to his or her account at POS terminal 41, the POS terminal communicates the player's account identifier and the amount to be added to central computer 34 as indicated at process block 80. The receiving central computer then updates the player's account information stored at database computer 28 (FIG. 3). As shown at block 81, POS terminal printer 53 may print a receipt for the player indicating the amount added to the account and perhaps the account balance after the addition.

In some preferred implementations of the invention, players may initiate game play requests through POS terminals 41 with the aid of the POS terminal attendant or cashier. This optional process is shown at the dashed process blocks at the bottom of FIG. 8. A player initiates a game play request at POS terminal 41 by providing account information to the POS terminal attendant/cashier or entering the information directly as shown at process block 82. With the aid of the attendant/cashier, the player ultimately makes an entry indicating his or her desire for a play in one of the games available through gaming system 10. POS terminal 41 then communicates a game play request to the central computer 34. The complete process performed at central computer 34 in response to the game play request will be described with reference to FIG. 10. The end result of the process for a valid game play request is that the central computer assigns a game play record to the requesting player and communicates information regarding the game play record back to the device from which the game play request was initiated. The receipt of this game play record information is shown at process block 83 in FIG. 8. POS terminal 41 uses this game play record information to print a game play receipt at process block 84 using the POS terminal printer 53 or some other printer associated with the POS terminal. The receipt may include a daubed reproduction of the bingo card representation corresponding to the game play record which was assigned to the player.

Referring now to FIG. 9, the preferred process at a player station 40 (FIG. 3) requires a player to log in to the gaming system as shown at block 85 prior to initiating a game play request at the station. In the preferred log-in process, the player inserts his or her player card into the player station card reader 47 (FIG. 3). This causes a communication to the central computer 34 which prompts the central computer to look up the player's account and then return an indicator indicating whether the account is valid or not. If the account is not valid, player station 40 displays a message directing the player to a POS terminal 41 to open an account as shown at process block 86. However, if the player does have a valid account, player station 40 may produce a message indicating that the system is ready for play, and waits for the logged in player to request a play in a game or take some other action. As indicated at decision block 90, if the player requests a play in a game, player station 40 communicates data representing a game play request to the respective central computer at block 94. The game play request data may include a wager amount indicator where different wagers are possible. In the preferred form of the invention different matched card sets are used to service game play requests at different wager levels. Thus, when a player designates a wager level at player station 40, that wager level designates a particular matched card set or type of matched card set stored at the central computer 34. In any event, player station 40 ultimately receives the results associated with the particular game play record assigned to the respective game play request by the central computer, and eventually displays those results as shown at process block 96. If the player's account card is then removed as indicated at decision block 98, the player is logged out of the system and the player station may go to an attract mode. Otherwise, player station 40 simply waits for the player to request another game play.

The manner in which a player requests a game play is dependent upon the particular type of player interface at the player station. Player controls may be included in the display in the form of a touch screen display such as display 45 in FIG. 4. Alternatively or in addition to a touch screen display, various buttons or other user interface devices may be included at the player stations as indicated by controls 46 in FIG. 4. Regardless of the particular player interface, the player operates the player station controls to request a game play, and thereby initiate a game play request communication from the player station to the central computer servicing the player station. The data included in the game play request communication must at least include sufficient data to allow the central computer to identify the matched game set from which the game play request is to be serviced. For example, the data included in a game play request may include a game type identifier which identifies a particular type of matched card set at the central computer 34. The central computer may then use this game type identifier to choose the appropriate matched card set from which to assign a game play record.

The steps involved in receiving and displaying the results associated with a game play record as indicated at process block 96 may vary significantly within the scope of the invention. For example, player station 40 may actually receive the information defining the grid (60 in FIG. 4) and display the grid to allow the player to daub the card. The information defining the grid of designations comprising the game card may comprise a data structure defining the respective designation at the respective locations on the grid or may comprise simply a serial number which the player station 40 may use to look up such a data structure in a database of such structures. This bingo card database may be stored at the player station or elsewhere in the gaming system. Daubing the card in this case would require matching designations on the grid to designations included in the respective set of game designations for the particular bingo-type game. This matching could be performed by the player at player station 40 or could be performed automatically at the player station in response to an automatic daubing request entered by the player in some fashion. The daubing would allow the player to determine whether there are any patterns of matching designations which represent a win in the particular game. Player station 40 may also be programmed to notify the player of winning patterns matched on the graphical card representation. Daubing a graphical representation of a bingo card at a player station may be thought of as manual daubing whether the daubing is performed by the player or performed by the player station at the request of the player. In the manual daubing mode, the data from the central computer from the assigned game play record may still be considered a result indicator since the data will in any event define the bingo card representation and the set of game designations matched with the card.

Alternatively to this manual daubing at player station 40, the player may rely on the matching of designations previously performed in the process of producing the matched card set. In this mode of play, the request for a play entered by the player at player station 40 represents a request for automatic daubing. Since no daubing is required at player station 40, the data communicated from the central computer 34 to the player station 40 need only include a result indicator containing information on whether the corresponding bingo card representation produced a winning or losing pattern when matched with the respective set of game designations. However, it may be desirable to still send to player station 40 information necessary to allow the station to produce a graphical representation of the respective matched bingo card.

In any of these "automatic daubing" arrangements and in some manual daubing arrangements, the result of the game play, that is, the result associated with the game play record assigned to the player, may be displayed in any number of fashions. For example, the results may be displayed as spinning reels imitating a slot machine. The spinning reels would stop at a point indicating a win or loss according to the result dictated by the purchased game play record and according to some predefined meaning of reel designation combinations. As other examples, the results may be displayed as a horse race, poker hand, or in any other desired fashion. In a fully automatic daubing system, the player may not even be aware he or she is playing a bingo-type game.

As shown in FIG. 10, central computer 34 is involved in servicing a game play request as well as creating, modifying, and cashing out a player's account. Since a game play request uses a wager to purchase a bingo card representation/game play result, a game play request can in fact be thought of as a particular type of request to modify the player's account. The central computer steps associated with creating an account are shown at dashed box 100 in FIG. 10, while the steps associated with adding funds to an account and cashing out an account are shown in FIG. 10 at dashed boxes 102 and 104, respectively. The central computer steps associated with logging a player in to a player station 40 or other floor device and with servicing a game play request are shown at dashed boxes 106 and 108, respectively in FIG. 10.

As shown at dashed box 100 in FIG. 10, if central computer 34 determines that the received communication is a request to create an account at decision block 110, the central computer cooperates with the database computer 28 to assign a unique account number to the player and to create a new entry for the player in the database controlled by database computer 28 (FIG. 3). This account number assignment and database entry step is shown at process block 111. The new database entry includes an account balance for the player. Information for the beginning account balance may have been communicated from the POS terminal 41 to the central computer along with the request to create a new account or may have been communicated in a separate step. Central computer 34 also communicates the new account information back to the respective POS terminal 41 from which the account creation request was received. As discussed above with reference to FIG. 8, POS terminal 41 uses this information to create a new player card and create a receipt for the player. Where the account is associated with a PIN, central computer 34 also stores the PIN information in the database entry for the player/account and confirms the PIN with the POS terminal. Once the account creation steps are complete, the process returns to START to wait for the next input from a gaming floor device.

If central computer 34 determines that a received communication is a request to add funds to an existing account at decision block 114, the process at the central computer branches to the steps shown in dashed box 102 in FIG. 10. The add funds steps include first checking to see if the account information associated with the request is a valid account as shown at decision block 115. If the account is not a valid account, central computer 34 returns an error message to the requesting POS terminal 41 as shown at 116 and may return to START. The determination indicated at decision block 115 may be made by querying database computer 28 (FIG. 3) to determine if the account identifier corresponds to an open or active account in the account/player database. If this account validation step indicates that the account is valid, central computer 34 updates the entry for the account to add the funds associated with the request as shown at process block 117. Central computer 34 also preferably confirms the execution of the add funds request by sending an appropriate confirmation back to the POS terminal 41 from which the request was received. This confirmation step is shown at process block 118. After confirmation, the process returns to START to wait for the next request from a gaming floor device.

If central computer 34 determines that a received communication is a request to cash out an existing account at decision block 121, the process at the central computer branches to the steps shown in dashed box 104 in FIG. 10. Central computer 34 first determines if the account identified in the request is a valid account at decision block 122 similarly to step 115 described above. If the account is not valid, central computer 34 causes an error message to be communicated back to the requesting POS terminal 41 as shown at block 123 and then returns to START. If the account is determined to be a valid account, central computer 34 updates the database by reducing the balance for the account to zero. This account database update step is shown at process block 124 in FIG. 10. After or in conjunction with the database update step, central computer 34 sends cashout information back to the requesting POS terminal as shown at process block 125 to allow the terminal and the cashier at the terminal to take the appropriate action.

Referring now to dashed box 106 in FIG. 10, central computer 34 detects a login request from a player station as shown at decision block 128. In response to the login request, central computer 34 determines if the account is valid as shown at decision block 129 and sends an error message back to the respective player station if the account associated with the login request is invalid as shown at process block 130. If the account is a valid account, central computer 34 communicates confirmation or login information back to the player station 40 to activate the station to accept a game play. This confirmation/login step is shown at process block 131 in FIG. 10. Central computer 34 then waits for the next request from a gaming floor device.

The game play request servicing processes at the central computer 34 are shown generally at dashed box 108. Upon receipt of a game play request as indicated at decision block 134, central computer 34 determines if the player's account has sufficient funds to cover the wager associated with the game play request. This determination is shown at decision block 135 and may be made by querying database computer 28 to determine the player's account balance and comparing it to the wager indicated in the game play request. If the player has insufficient funds in his or her account, central computer 34 sends an insufficient funds message back to the respective player station 40 as shown at process block 136. However, if the player has sufficient funds in his or her account to cover the wager associated with the game play request, central computer 34 assigns to the requesting player the next available game play record in the appropriate matched card set as shown at block 137 in FIG. 10. This step may also include the step of communicating the result associated with the game play record to the respective player terminal. Central computer 34 then modifies the player's account data at database computer 28 by debiting the amount of the wager and adding the amount of any winnings associated with the game play record assigned to the player. This account modification step is shown at block 138 in FIG. 10.

Figure 11:
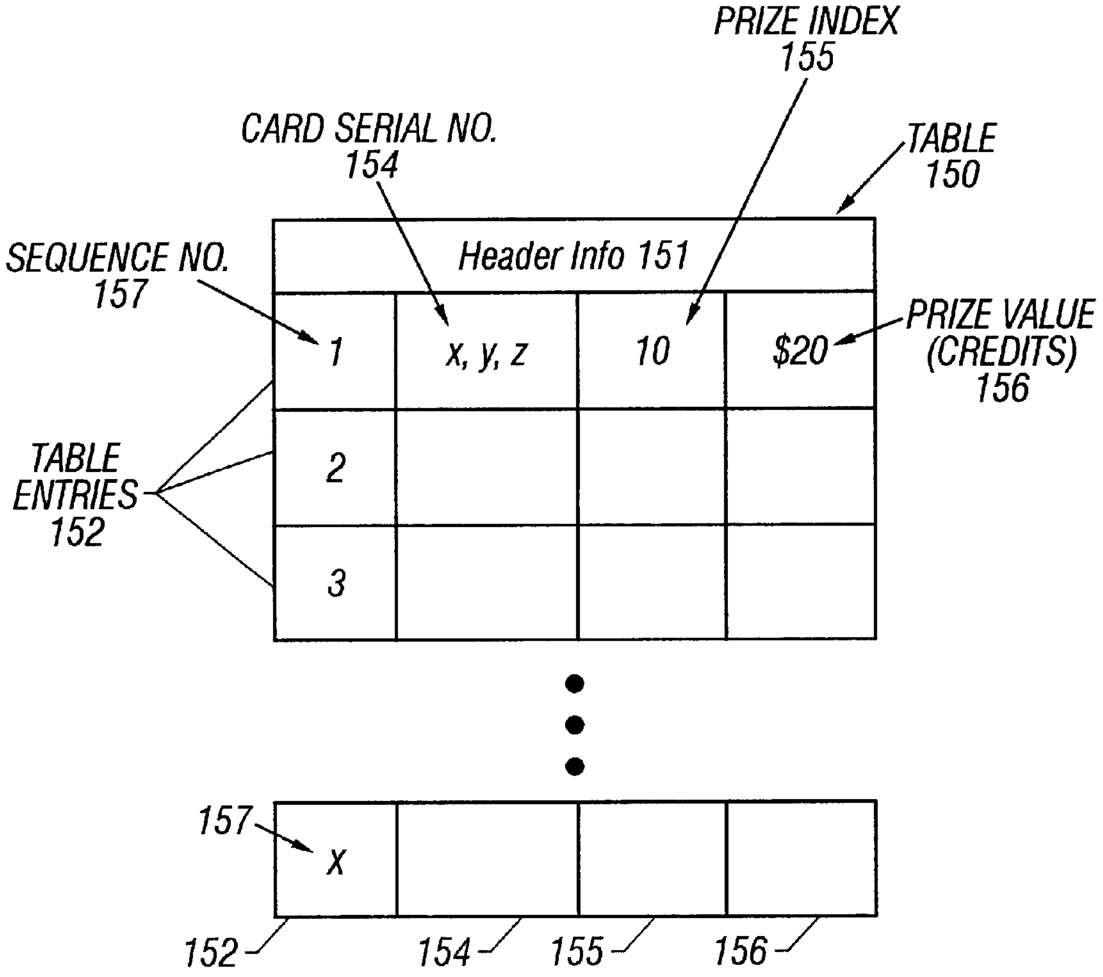
FIG. 11 is a diagrammatic representation of a portion of the data representing a matched card set according to one preferred form of the present invention.

FIG. 11 shows the data representing a matched card set according to one preferred form of the invention. The data is stored in a table 150 including a header 151 identifying the matched card set and distinguishing it from any other card set that is in play or may be created. Header 151 may also include information identifying the matched card set as one to be used for a certain wager level and may further include information identifying or defining the set of game designations used to produce the respective matched card set. Table 150 further includes a number of entries 152, each entry representing a respective game play record in the matched card set and corresponding to a different bingo card representation in the set of bingo card representations used to create the matched card set. Each entry 152 includes an ID field 154 containing a card serial number or other card defining information for the respective bingo card representation which corresponds to the entry. Each entry 152 further includes a prize index field 155, prize value field 156, and sequence number field 157. Prize index field 155 contains a value indicating whether the bingo card representation which corresponds to the entry is a winner or loser for the particular set of game designations with which the representation is matched, while prize value field 156 contains information indicating the value of any prize for the respective matched card representation and thus the prize value of the game play record. Field 157 contains a value for the sequence the respective entry or game play record is to be assigned in the bingo-type game. The entries 152 may be shuffled by card set computer 26 preferably before being matched to the respective set of game designations in order to randomize the sequence in which the game play records are assigned from the set. In the illustrated form of the invention, the entries are ordered in the set by sequence value. In other forms of the invention, entries may remain in some fixed order but be assigned at random from the set.

A number of these matched card sets each represented by a different data structure such as table 150 are created and stored at card set computer 26 in the preferred gaming system illustrated in FIG. 3. Matched card sets are then transferred to a central computer, such as computer 34 for example, as necessary. The preferred central computers include program code for monitoring his or her local store of matched card sets and ensuring that requests for additional matched card sets are issued in time to obtain additional sets before running out of records in the currently stored set or sets.

The respective central computer holds one or more of these matched card sets and assigns an entry 152 or information from (or derived from) an entry to a requesting player station (40 in FIG. 2) in response to a game play request received as indicated at process block 66 in FIG. 7. In this preferred form of the invention, the player station 40 may display results according to process block 68 in FIG. 6, by simply displaying the prize value from field 156 or by looking up and displaying a prize value associated with the prize index from index field 155. This latter option requires that the player station 40 or memory accessible to the player station store a table relating prize index values to actual prize values. The graphics displayed to the player in these cases may be related to a traditional bingo game or may be totally unrelated to such a game and instead mimic some other type of game such as a casino game. Also, it should be noted that where game results are shown or dictated by reference to a prize value from field 156 or prize index value from field 155, one of these values is all that must be communicated to the player station in response to a game play request, and the table 150 and entries 152 may be limited accordingly to eliminate the unnecessary field or fields. Alternatively, where the display to be produced at player station 40 is to include the grid making up the bingo card representation corresponding to the respective game play record, the player station may look up the card defining information either from table 150 or from information included in table 150 and display an actual facsimile of the purchased card.

There are numerous variations on how the result of the match between the player's assigned bingo card representation and the applicable set of game designations is communicated to the player station 40 and displayed for the player. In some forms of the invention, the actual game play record may be sent to the player station 40 and the card representation displayed along with the current set of game designations. The player may then daub the displayed card by controls at the player station. Alternatively, if the result has been determined by the central computer 34 or card set computer 26 (that is, if the bingo card representation is automatically daubed or matched by the respective computer), the result of the game play or game card purchase may be communicated in a way wholly or partially unrelated to the actual match between card designations and designations of the set of game designations. For example, the result could be displayed as a horse or dog race, or as a result in a casino game such as poker, craps, roulette, a reel-type game (slot machine) or other game. In other words, the results may be displayed so that the player is unaware he or she is participating in a bingo-type game. Further alternative result display techniques within the scope of the invention may retain aspects of a traditional bingo game and combine those aspects with other games in some way.

Figure 12:
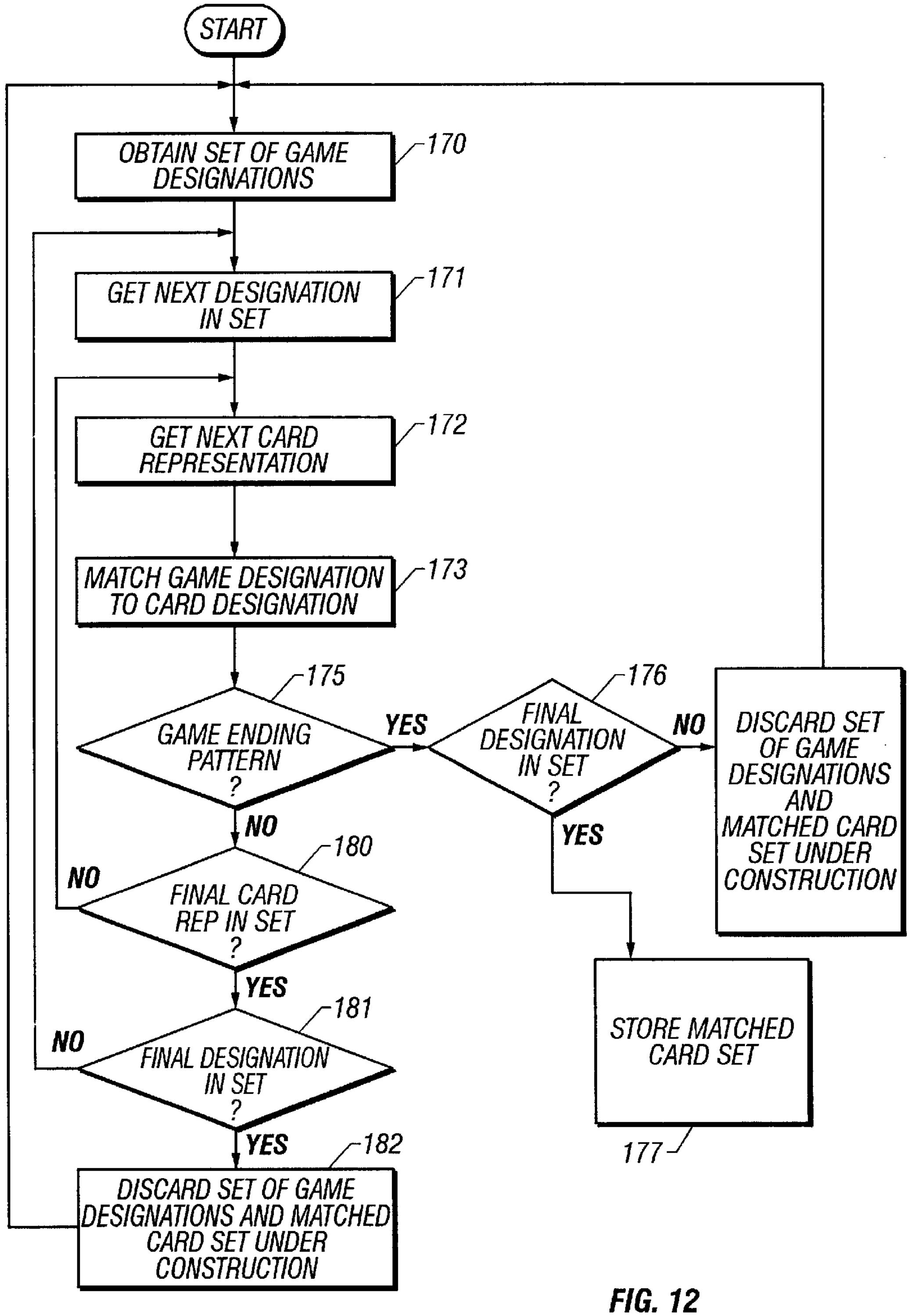
FIG. 12 is a flow chart showing the preferred method for producing matched card sets according to the invention.
Figure 10:
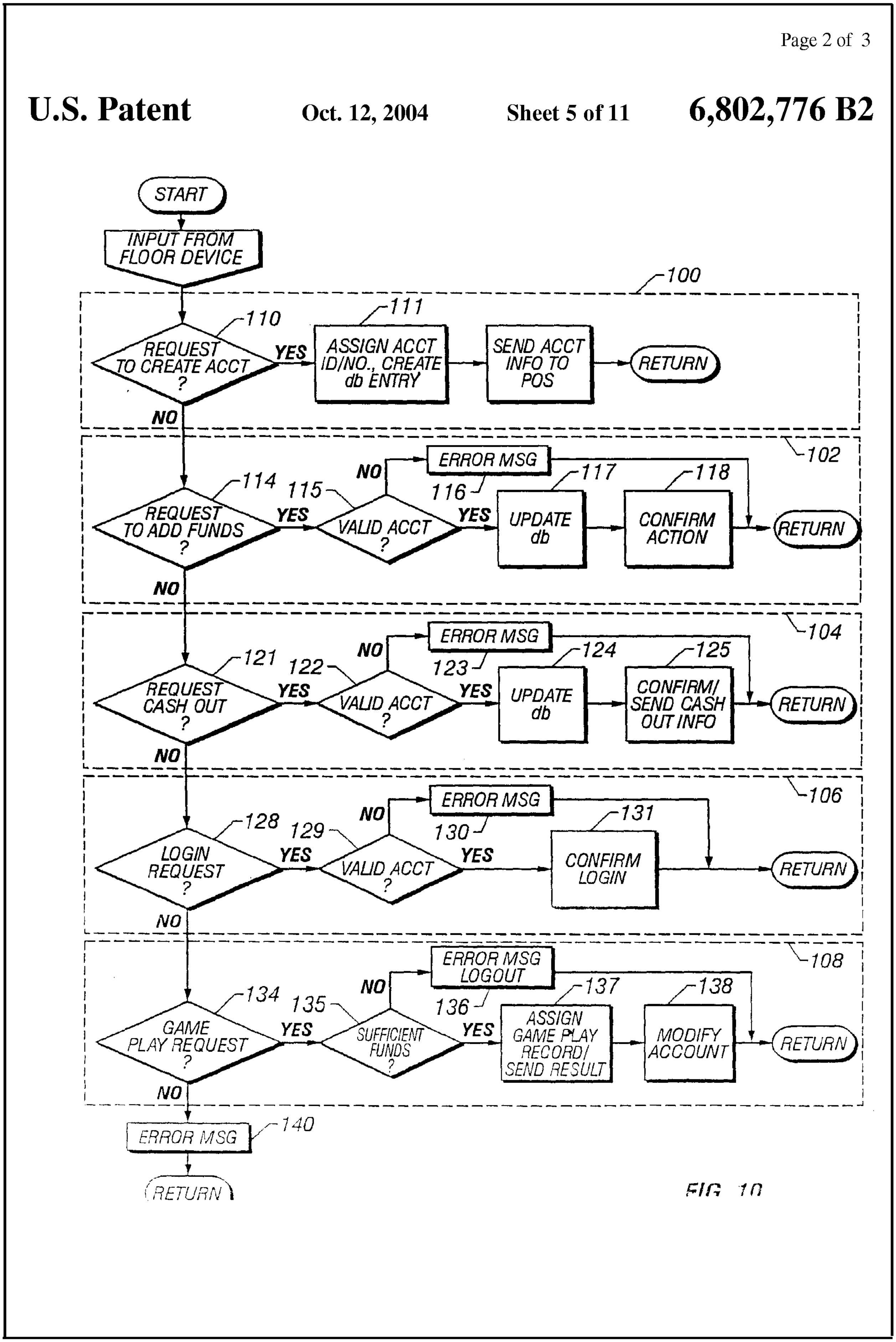

FIG. 12 illustrates one preferred process according to the invention for producing matched card sets. As discussed above with reference to FIG. 7, this process is performed by the matching program code preferably executed at card set computer 26 in FIG. 3. Process block 170 shows the step of obtaining a set of game designations from a designation generating device such as device 16 in FIG. 1 or 16' in FIG. 2. In the latter case the step may comprise executing the game designation generating program code at card set computer 26. After obtaining the set of game designations to be used in the respective game, the process includes selecting the next designation from the set of designations as shown at block 171 and selecting the next bingo card representation from the set of card representations as shown at process block 172. The process then proceeds to the step of matching the selected game designation with the selected card representation as shown at block 173. It will be noted that the sequence of bingo card representations in the set are preferably shuffled prior to the initial step 172 in the process shown in FIG. 12. This shuffling sets the order or sequence in which the game play records are assigned in the play of gaming system 10.

The preferred process for producing matched card sets ensures that the only matched card sets which are stored and used in the system are those in which the game ending pattern is produced in one of the bingo card representations on the final game designation included in the game designation set obtained at block 170. Thus, the process includes a series of decisions to determine if the matched card set being produced meets that criteria. The program code for discarding matched card sets that do not meet the desired criteria may be referred to as matched card set rejection program code.

As shown at decision block 175 the process includes determining if the matching conducted at block 173 produced the applicable game ending pattern in the selected bingo card representation. If so, the process branches to decision block 176 and then includes determining if the currently selected game designation is the final designation in the current set of game designations. If not, the process includes discarding the data associated with the matched card set under construction and starting the process over at process block 170. However, if the selected game designation is the final designation in the current set, then the process stores the resulting matched card set for later use by a central computer 34 or 36 in FIG. 3. This storage step is shown at process block 177 in FIG. 12. The process may then begin again to produce an additional matched card set or the process may be terminated if no further matched card sets are then needed.

If the game ending pattern was not indicated at decision block 175, the process branches to decision block 180 to determine whether the selected bingo card representation is the final card in the set. If not, the process returns to the step shown at process block 172 to begin the matching process again with the next bingo card representation in the set. If the card representation is the final one in the set, the process determines whether the selected game designation is the final designation in the current set as shown at decision block 181. At this point the process returns to step 171 if the game designation is not the final one in the current set. However, the fact that the selected game designation is the final one in the current set at this point indicates that the set of bingo card representations will not match with the current set of game designations to meet the specified criteria and the data for the matched set under construction is deleted as indicated at process block 182. The process begins again at block 170 unless terminated for some reason.

It will be appreciated that the step of storing the matched card set at process block 177 in FIG. 12 may comprise storing a card set in which some bingo card representations have not been fully matched. Also, in the preferred forms of the invention, no further game play records are assigned after a player holds a game play record corresponding to a card representation matched in the game ending pattern. Thus, any records corresponding to unmatched bingo card representations need not be maintained and may be deleted. The invention preferably includes matched card set truncation program code for deleting out any records ordered or sequenced in the matched card set after the card matched in the game ending pattern.

The above described preferred embodiments are intended to illustrate the principles of the invention, but not to limit the scope of the invention. Various other embodiments and modifications to these preferred embodiments may be made by those skilled in the art without departing from the scope of the present invention. For example, although a particular hardware arrangement is shown for purposes of describing the invention, it will be appreciated that numerous hardware arrangements are possible for implementing the present invention. Also, although the operational software-controlled process steps are described as occurring at certain processing elements in the system, the processing steps may be distributed in any suitable fashion over various data processing elements.

What is claimed is:

1. A method of producing and utilizing a set of game play records for a bingo-type game which employs a first set of game designations selected from a pool of available game designations and further employs a set of bingo card representations, each bingo card representation in the set of bingo card representations including a number of card designations which are selected from the pool of available game designations, the method including the steps of:

(a) matching the first set of game designations with card designations of the respective bingo card representations to produce a matched card set, the matched card set including a number of game play records with each game play record corresponding to a different one of the bingo card representations and including a result indicator indicating a result of the match between the first set of game designations and the card designations for the respective bingo card representation to which the respective game play record corresponds;

(b) storing data representing the matched card set in a data storage device; and (c) assigning game play records from the matched card set in a random order, each game play record assigned to a respective player among a number of players participating in the bingo-type game in response to a game play request initiated by the respective player.

2. The method of claim 1 wherein the bingo-type game utilizes a predetermined game ending pattern of matches and further including the steps of:

(a) determining if the game ending pattern of matches exists in any of the set of bingo card representations upon matching a final game designation from the first set of game designations; and (b) disregarding each matched card set for which the game ending pattern occurs before matching the final designation in the first set of game designations or for which the game ending pattern is not produced upon matching the final designation in the first set of game designations.

3. The method of claim 1 wherein the step of assigning a number of the game play records includes:

(a) assigning game play records from the matched card set until a player holds a game play record corresponding to a matched bingo card representation having a game ending pattern; and (b) disregarding any of the game play records in the matched card set remaining after the respective player holds the game play record corresponding to the matched bingo card representation having the game ending pattern.

4. The method of claim 1 further including the step of truncating the matched card set to remove all game play records which are ordered in the matched card set after a game play record corresponding to a matched bingo card representation which is matched in a game ending pattern.

5. The method of claim 1 wherein the step of assigning the game play records in the random order is accomplished by randomizing an order of the bingo card representations in the set of bingo card representations prior to the step of matching the first set of game designations with card designations of the respective bingo card representations to produce the matched card set.

6. The method of claim 1 wherein the step of assigning the game play records in the random order is accomplished by randomizing an order of the game play records in the matched card set.

7. The method of claim 1 using a number of additional game designation sets produced from the pool of available game designations and further including the step of matching each additional game designation set with the card designations of the respective bingo card representations to produce an additional matched card set for each additional game designation set, each additional matched card set including a number of respective additional game play records with each additional game play record corresponding to a different one of the bingo card representations and including a card identifier for the respective bingo card representation with which the game play record corresponds and a result indicator indicating a result of the match between the respective additional set of game designations and the card designations for the respective card representation.

8. The method of claim 7 further including the steps of:

(a) storing data representing each respective additional matched card set in the data storage device; and (b) assigning game play records from one of the additional matched card sets in response to a game play request submitted after a game winning game play record has been assigned from the first matched card set.

9. The method of claim 8 further including the step of assigning additional game play records from another one of the respective additional matched card sets in response to a game play request submitted after a winning game play record has been assigned from an immediately preceding one of the additional matched card sets.

10. A program product stored on a computer readable medium for producing and utilizing a set of game play records for a bingo-type game which employs a first set of game designations selected from a pool of available game designations and further employs a set of bingo card representations, each bingo card representation in the set of bingo card representations including a number of card designations which are selected from the pool of available game designations, the program product including:

(a) matching program code for matching a first set of game designations with card designations of the respective bingo card representations to produce a matched card set, the matched card set including a number of game play records with each game play record corresponding to a different one of the bingo card representations and including a result indicator indicating a result of the match between the first set of game designations and the card designations for the respective bingo card representation to which the respective game play record corresponds;

(b) game set storage program code for storing data representing the matched card set in a data storage device; and (c) game play assignment program code for assigning game play records from the matched card set in a random order, each game play record assigned to a respective player among a number of players participating in the bingo-type game in response to a game play request initiated by the respective player.

11. The program product of claim 10 wherein the bingo-type game utilizes a predetermined game ending pattern of matches and the matching program code also determines if the game ending pattern of matches exists in any of the set of bingo card representations upon matching a final game designation from the first set of game designations and further including:

(a) matched card set rejections program code for rejecting each matched card set for which the game ending pattern occurs before matching the final designation in the first set of game designations or for which the game ending pattern is not produced upon matching the final designation in the first set of game designations.

12. The program product of claim 10 further including:

(a) winning play monitoring program code for detecting when a player holds a game play record corresponding to a matched bingo card representation having a game ending pattern; and (b) matched card set switching program code for switching to a different matched card set when the winning play monitoring program code detects when a player holds the game play record corresponding to the matched bingo card representation having the game ending pattern.

13. The program product of claim 10 further including matched card set truncation program code for truncating the matched card set to remove all game play records which are ordered in the matched card set after a game play record corresponding to a matched bingo card representation which is matched in a game ending pattern.

14. The program product of claim 10 further including randomizing program code for randomizing an order of the bingo card representations in the set of bingo card representations prior to the step of matching the first set of game designations with card designations of the respective bingo card representations to produce the matched card set.

15. The program product of claim 10 further including randomizing program code for randomizing an order of the game play records in the matched card set.

16. The program product of claim 10 using a number of additional game designation sets produced from the pool of available game designations and wherein the matching program code matches each additional game designation set with the card designations of the respective bingo card representations to produce an additional matched card set for each additional game designation set, each additional matched card set including a number of respective additional game play records with each additional game play record corresponding to a different one of the bingo card representations and including a card identifier for the respective bingo card representation with which the game play record corresponds and a result indicator indicating a result of the match between the respective additional set of game designations and the card designations for the respective card representation.

17. The program product of claim 16 wherein:

(a) the game set storage program code stores data representing each respective additional matched card set in the data storage device; and (b) the game play assignment program code assigns game play records from one of the additional matched card sets in response to a game play request submitted after a game winning game play record has been assigned from the first matched card set.

18. The program product of claim 17 wherein the game play assignment program code assigns additional game play records from another one of the respective additional matched card sets in response to a game play request submitted after a winning game play record has been assigned from an immediately preceding one of the additional matched card sets.

19. A method of producing and utilizing a set of game play records for a bingo-type game, the method including the steps of:

(a) matching designations from a first set of game designations to a number of bingo card representations to produce a matched card set, the matched card set comprising a collection of data that defines a number of matched bingo card representations where each matched bingo card representation corresponds to a respective game play record for the bingo-type game; and (b) assigning a number of the matched bingo card representations from the matched card set, each matched bingo card representation being assigned to a respective player in response to a game play request of the respective player.

20. The method of claim 19 further including the step of storing the data that comprises the matched card set, the data being stored in a data storage device.

21. The method of claim 19 further including the step of disregarding each matched card set in which a game ending pattern is not produced upon matching a final designation in the first set of game designations to the bingo card representations.

22. The method of claim 19 wherein the step of assigning a number of the matched bingo card representations includes:

(a) assigning matched bingo card representations from the matched card set until a player has been assigned a matched bingo card representation having a game ending pattern; and (b) disregarding any of the matched bingo card representations in the matched card set remaining after the respective player has been assigned the matched bingo card representation having the game ending pattern.

23. The method of claim 19 further including the step of randomizing an order of the matched bingo card representations in the matched card set.

24. The method of claim 23 wherein the step of randomizing the order of the matched bingo card representations in the matched card set comprises shuffling the order of the bingo card representations in a set of bingo card representations prior to the step of matching designations from the first set of game designations to the bingo card representations.

25. The method of claim 23 wherein the step of randomizing the order of the matched bingo card representations in the matched card set comprises shuffling the order of the bingo card representations in the set of bingo card representations after the step of matching designations from the first set of game designations to the bingo card representations.

26. The method of claim 19 further including the step of matching designations from a number of additional game designation sets to the bingo card representations to produce a number of additional matched card sets, each additional matched card set including a number of respective matched bingo card representations with each respective matched bingo card representation corresponding to a respective game play record for the bingo-type game.

27. The method of claim 26 further including the steps of:

(a) storing data representing each respective additional matched card set in a data storage device; and (b) assigning card representations from one of the additional matched card sets in response to a game play request submitted after a game winning bingo card representation has been assigned from the first matched card set.

28. A program product stored on a computer readable medium for producing and utilizing a set of game play records for a bingo-type game, the program product including:

(a) matching program code for matching designations from a first set of game designations to a number of bingo card representations to produce a matched card set, the matched card set comprising a collection of data defining a number of matched bingo card representations where each matched bingo card representation corresponds to a respective game play record for the bingo-type game; and (b) game play assignment program code for assigning a number of the matched bingo card representations from the matched card set, each matched bingo card representation being assigned to a respective player in response to a game play request initiated by the respective player.

29. The program product of claim 28 further including game set storage program code for storing the collection of data that comprises the matched card set.

30. The program code of claim 28 further including rejection program code for rejecting the matched card set in the event that a game ending pattern does not occur upon matching a final designation in the first set of designations to the bingo card representations.

31. The program product of claim 28 further including:

(a) winning play monitoring program code for detecting when a player is assigned a matched bingo card representation having a game ending pattern; and (b) matched card set switching program code for switching to a different matched card set when the winning play monitoring program code detects that a player is assigned the matched bingo card representation having the game ending pattern.

32. The program product of claim 28 further including randomizing program code for randomizing an order of the matched bingo card representations in the matched card set.

33. The program product of claim 28 wherein the matching program code matches designations from a number of additional game designation sets to the bingo card representations to produce a number of additional matched card sets, each additional matched card set comprised of a collection of data defining a number of respective matched bingo card representations, where each respective matched bingo card representation corresponds to a respective game play record for the bingo-type game.

34. The program product of claim 33 wherein:

(a) the game set storage program code stores data representing each respective additional matched card set in a data storage device; and (b) the game play assignment program code assigns bingo card representations from one of the additional matched card sets in response to a game play request submitted after a game winning bingo card representation has been assigned from the first matched card set.

35. An apparatus for enabling the play of a bingo-type game employing a set of bingo card representations, the apparatus comprising:

(a) a number of player stations, each player station for enabling a player to initiate a game play request and for displaying results of a game play upon receipt of a respective game play record assigned from a number of game play records;

(b) a central processing system for storing a matched card set including the number of game play records, each respective game play record corresponding to a respective bingo card representation in the set of bingo card representations which has been pre-matched to a first set of game designations, the central processing system also for assigning a respective game play record from the matched card set to a player in response to a game play request initiated by the respective player at a respective one of the player stations; and (c) a communications system operatively connected to the central processing system and to each of the player stations for facilitating communications between the central processing system and each player station.

36. The apparatus of claim 35 wherein:

(a) the central processing system stores a number of additional sets of game play records, each game play record in a respective additional set of game play records corresponding to a respective one of the bingo card representations which has been pre-matched to an additional set of game designations; and (b) the central processing system also assigns a respective game play record from one of the additional sets of game play records to a player in response to a game play request initiated by the respective player at a respective one of the player stations after a winning game play record has been assigned from the first set of game play records.

37. The apparatus of claim 36 wherein the winning game play record corresponds to a bingo card representation having card designations that match with designations in the first set of game designations to produce a predetermined game ending pattern.

* * * * *

UNITED STATES PATENT AND TRADEMARK OFFICE

CERTIFICATE OF CORRECTION

PATENT NO. : 6,802,776 B2 
DATED : October 12, 2004
INVENTOR(S) : Clifton Lind et al.

It is certified that error appears in the above-identified patent and that said Letters Patent is hereby corrected as shown below:

Replace Drawing Sheets 5 and 9 with the attached replacement drawing sheets which contains Figures 5, 6 and 10.

Signed and Sealed this

Twenty-eighth Day of February, 2006

Jon W. Dudas

JON W. DUDAS
*Director of the United States Patent and Trademark Office*

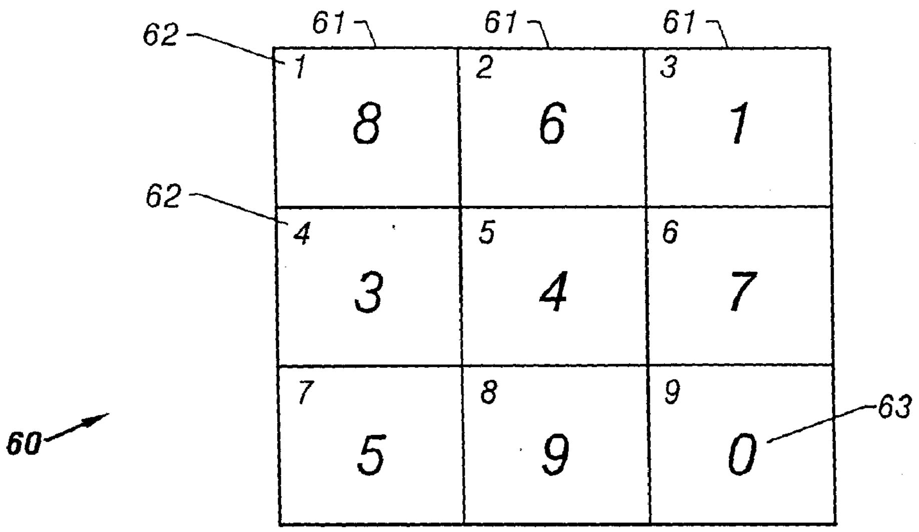

FIG. 5

PRIZE SCHEDULE (Prizes are in credits per credit wagered)

| Prize | Pattern | Odds (to 1) | Prize (credits) | Allocation |
|---|---|---|---|---|
| Super Jackpot* | Any 2 Row | 333,333 | 20000 | 6.00% |
| Jackpot | Middle Row | 1,000 | 100 | 10.00% |
| Must Go | Top or Bottom Row | 500 | 25 | 5.00% |
| Consolation | Column or Diagonal | 200 | 10 | 5.00% |
| Churn | Any 2 Adjacent Spots | 5 | 3 | 60.00% |
| Allocation to "Max Bet" Super Jackpot Progressive: | | | | 4.00% |
| | | | Total Prize Allocation: | 90.00% |

Note 1: 4% of all wagers is allocated to growth of the "Max Bet" Super Jackpot

Note 2: Average number of cards to end game: 333,33

FIG. 6